Oct. 31, 1967  J. A. BARING  3,349,666
FLASH EXPOSURE METER
Filed March 22, 1963
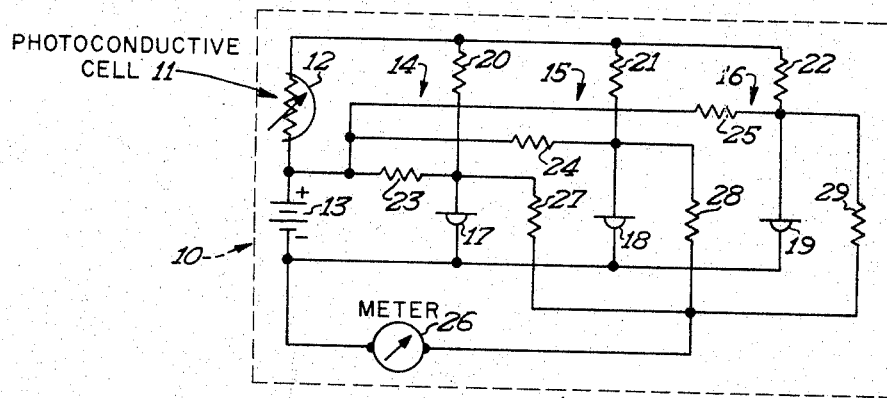
Fig 1
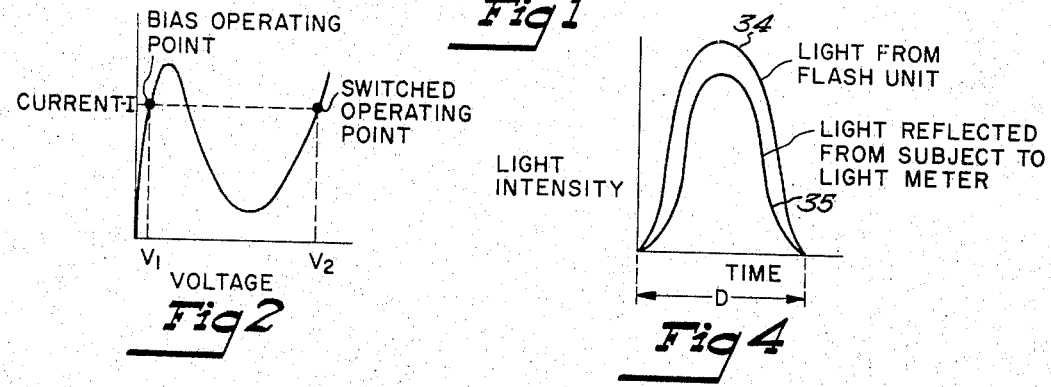
Fig 2
Fig 4
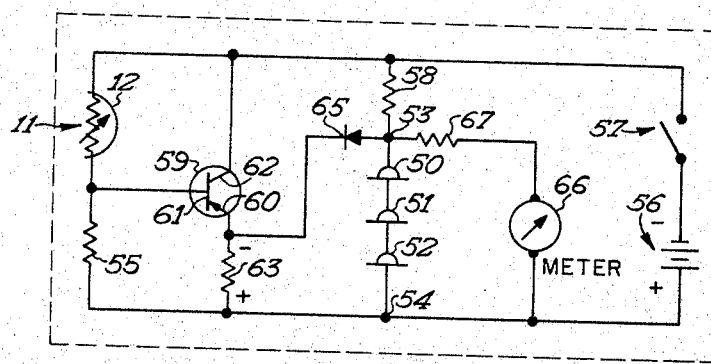
Fig 5
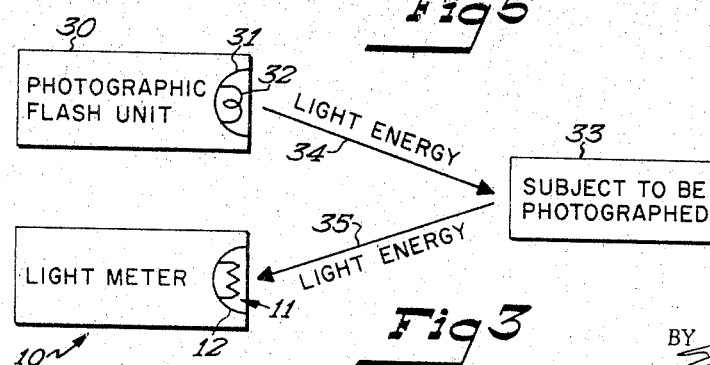
Fig 3
INVENTOR.
JOHN A. BARING
BY
ATTORNEY

United States Patent Office 3,349,666
Patented Oct. 31, 1967

3,349,666
FLASH EXPOSURE METER
John A. Baring, Golden, Colo., assignor to Honeywell Inc., a corporation of Delaware
Filed Mar. 22, 1963, Ser. No. 267,139
5 Claims. (Cl. 88—23)

The present invention is concerned with an improved electric apparatus and particularly with an apparatus which is constructed and arranged to provide a peak reading function, to read the peak value of an electrical transient condition, and to provide a continuous output indicative of such a peak condition, after the condition has ceased to exist.

Particularly, the subject matter of my invention has utility when utilized as a flash exposure meter of a type constructed and arranged to provide an output indicative of the integrated quantity of light energy available in a short time duration flash of light of the type produced by photographic flash equipment, and particularly electronic photographic flash equipment wherein a high voltage capacitor is discharged through a gas filled tube, to produce a short time duration flash of light, for example, in the nature of 1/1000 of a second.

Specifically, the construction of my invention utilizes an arrangement of tunnel diodes, wherein a plurality of tunnel diodes are biased to initially operate at a first stable operating point on the low voltage portion of the characteristic curve of such tunnel diodes. I provide a unique circuit construction whereby a transient voltage, or current, pulse, when applied to a circuit construction utilizing such tunnel diodes, is effective to trigger a proportionate number of the tunnel diodes to a second stable operating point at the high voltage portion of the characteristics. The proportionate number of tunnel diodes which are so triggered is representative of the peak magnitude of the transient electrical condition applied to the tunnel diode to cause such a switching function to take place. By virtue of the biasing circuit arrangement, once such tunnel diodes are switched to the higher voltage operating point, they are maintained at this point until the bias is removed. Thus a continuous readout is provided to indicate the peak magnitude of the transient condition which has occurred.

The stability of the tunnel diodes, either in the low voltage or the high voltage portion of their characteristics, results by virtue of the negative resistance which is present in certain portions of the characteristics of the tunnel diode, the negative resistance existing between the low and high voltage operating points.

More specifically, my unique electric apparatus may be utilized with a cadmium sulfide photoconductive cell which, when subjected to a short time duration flash of light, generates holes and electrons of relatively long life time, and in a quantity which is proportional to the integrated quantity of light energy present in the flash of light. My tunnel diode circuit, which can be characterized as a readout, is utilized to quickly readout the number of holes and electrons thus generated within the photoconductive material and to, as a result thereof, cause a short time duration transient disturbance to occur, the peak magnitude of which is proportional to the total amount of light energy present in the flash of light. Thus. the above mentioned tunnel diodes are switched to their high voltage operating point in proportion to the quantity of light, and a readout is obtained which may be calibrated in terms of the integrated quantity of light.

My invention will be apparent to those skilled in the art upon reference to the following specification, claims, and drawings, of which FIGURE 1 is a schematic representation of a first embodiment of my invention, FIGURE 2 is a showing of the voltage-current characteristics of the tunnel diodes utilized in FIGURE 1 and FIGURE 5, FIGURE 3 is a diagrammatic representation of the structural relationship of a photographic flash unit which is arranged to illuminate a subject to be photographed, the light energy being reflected from the subject to be photographed to light meter of FIGURES 1, or 5.

FIGURE 4 is a graph showing the time duration light intensity magnitude of the flash of light produced by the flash unit, and the light which is reflected from the subject to the light meter of FIGURE 3, and FIGURE 5 is a showing of a second embodiment of my invention.

Referring specifically to FIGURE 1, reference numeral 10 designates a housing within which is contained a light meter. This light meter includes a photoconductive cell 11 structurally arranged within a reflector 12.

The reflector 12 is shown only generally, in that it is well known that such reflectors, or optical means, may be provided to restrict the viewing angle of the photoconductive cell 11.

Photoconductive cell 11 is connected in circuit with a battery 13, which in turn is connected through three parallel circuit means 14, 15 and 16, to the photoconductive cell 11. Each of the parallel circuit means 14–16 is provided with a tunnel diode 17, 18 and 19 respectively, the tunnel diodes being connected in series with resistors 20, 21 and 22 respectively. As can be seen, voltage source 13 is connected to the tunnel diodes in a forward direction, the negative terminal thereof being connected to the cathode of the tunnel diodes and the positive terminal thereof being connected through photoconductive cell 11 and the respective resistors 20–22 to the anode of the tunnel diodes.

In the embodiment of my invention as shown in FIGURE 1, the resistors 20, 21 and 22 have progressively increasing resistance values. In this manner, a sudden pulse of current which flows from photoconductive cell 11 divides through the parallel paths 14, 15 and 16, the larger current flowing through path 14, a somewhat smaller current flowing through path 15, and a still smaller current flowing through path 16. The peak magnitude of these individual three currents is determined by the peak magnitude of the current flowing through photoconductive cell 11, as will be described.

The resistors 23, 24 and 25 constitute, in combination with voltage source 13, a circuit means to bias the individual tunnel diodes 17, 18 and 19 to a first stable operating point at the low voltage portion of their characteristics.

Referring to FIGURE 2, a graph is presented showing the voltage-current characteristics of the tunnel diodes, and the point on the current axis labeled I is the point established by the respective resistors 23, 24 and 25 and by voltage source 13. Thus, the first stable operating point of the tunnel diode is at the point labeled "bias operating point," in which a low voltage $V_1$ exists across the tunnel diode.

Referring again to FIGURE 1, reference numeral 26 designates a voltage or current responsive means in the form of a meter. The left hand terminal of the meter is connected to the cathode of the tunnel diodes 17, 18 and 19 while the right hand end of the meter is connected through the respective resistors 27, 28 and 29 to the anode of each of the tunnel diodes. Thus, the voltage drop existing across each of the individual tunnel diodes is summed, by way of the resistors 27–29 to the meter 26.

Considering the operation of the structure of FIGURE 1, reference will be made to FIGURE 3 wherein reference numeral 30 designates a photographic flash unit having a reflector 31 and a source of light 32. This photographic flash unit 30 is effective to generate a short time duration flash of light which is directed toward the subject to be photographed, identified by reference numeral 34. The light so generated is referenced by numeral 33. As a result of such a flash of light, light energy is reflected from the subject to be photographed to the light meter 10. Such reflected light energy is referenced by numeral 35.

FIGURE 4 shows a representative curve of light intensity-versus-time for the light from the flash unit, 34, and the light reflected from the subject to the light meter, 35. It is to be understood that the time period designated by the letter D represents a relatively short time period, in the nature of a few thousands of a second for the case where the photographic flash unit 30 of FIGURE 3 is the so-called electronic type flash unit. The difference in magnitude between the curves 34 and 35 of FIGURE 4 is occasioned by the losses incident with the reflectance of the light energy 34 from the subject to be photographed. In general, the curve 34 and 35 are of similar shape.

When dealing with measurement of light energy produced by a photographic flash unit, it is necessary to measure the integrated or the total quantity of light present in a flash of light produced by such a flash unit. It will be readily appreciated that different flash units may have identical peak values of light, and yet have different total quantities of light, so that film located within an associated camera is effected in a different manner by one flash unit than by another. However, if the integrated quanity of light under curve 35 of FIGURE 4 is determined, an accurate reading of total light energy is obtained. Conventionally, manufacturers of photographic flash units supply "guide numbers" to rate the light output of the respective flash unit, and to relate this guide number to a particular film speed or sensitivity. However, this actual guide number which should be used varies as the operative condition of the photographic flash unit varies, and as the reflectance characteristics of the subject to be photographed and of the background near the subject vary.

With the apparatus as disclosed in FIGURE 1, the light energy 35 which impinges upon photoconductive cell 11 for the short time duration D is effective to photogenerate holes and electrons within the semiconductor material of photoconductive cell 11. The total accumulation of such holes and electrons which exists at the end of the time period D is proportional to the total quantity of light energy present under curve 35 of FIGURE 4. The electrical circuit of FIGURE 1, by virtue of battery 13, applies an electric field to photoconductive cell 11 and, as a result, by far the majority of such photogenerated holes and electrons are caused to flow as electric current through the circuits 14, 15 and 16. The recombination rate of such holes and electrons, within the time period in which such a pulse of current flows through the circuits 14, 15 and 16, is relatively slight, in view of the fact that the holes and electrons generated in such photoconductive cells have a long time life. Examples of such photoconductive cells are lead sulfide, cadmium sulfide, and cadmium selenide.

As mentioned above, the pulses of current which flow through the respective circuits, 14, 15 and 16 have peak magnitudes determined by the total quantity of holes and electrons generated, this quantity being proportional to the total amount of light energy present under curve 35 of FIGURE 4. Furthermore, the current flowing through circuit 14 is always larger than the current flowing through circuit 15, while the current flowing through circuit 15 is always larger than the current flowing through circuit 16. Thus, for a given peak magnitude of current which flows from photoconductive cell 11, the tunnel diodes are triggered in the order 17, 18 and 19. For a low value intensity of light energy 35, only tunnel diode 17 is triggered. For an intermediate value, tunnel diode 18 is also triggered. For the highest value of light to be measured, tunnel diode 19 is also triggered. In this manner, meter 26 moves up scale to a first position upon tunnel diode 17 being triggered, moves to a higher intermediate position, upon tunnel diodes 17 and 18 being triggered, and moves to a still higher position upon the tunnel diodes 17, 18 and 19 being triggered.

It is to be understood that I have shown three tunnel diodes only by way of example, and that more or less such diodes may be used in parallel configuration.

Referring now to FIGURE 2, the process by which the tunnel diode is triggered will be explained. As mentioned above, the "bias operating point" is a first stable condition of operation for the tunnel diode, as established by the resistors 23, 24 and 25 and by voltage source 13. The pulse of current which flows through the respective circuits 14, 15 and 16 must be sufficient to move the operating point of its tunnel diode over the peak point in the characteristic, to thus change the characteristic of the tunnel diode to a negative resistance characteristic. When this occurs, the operating point immediately switches to a second stable operating point, designated "switched operating point." At this point a high voltage $V_2$ exists across the switched tunnel diode. Furthermore, the switched tunnel diode, now at the second stable operating point, is maintained at this point by the bias current, labeled "I."

Referring now to FIGURE 5, I have shown a second embodiment of my invention wherein series tunnel diodes are utilized, rather than the parallel configuration of the tunnel diodes as seen in FIGURE 1.

Here again, three diodes have been shown only by way of example. More or less diodes may be connected in series, as desired.

Reference numerals 50, 51 and 52 designate tunnel diodes having the cathodes connected to terminal 53 and having the anodes connected to terminal 54. The photoconductive cell 11 of FIGURE 5 is connected in circuit with a resistor 55, and by way of this resistor to a source of voltage 56, through a switch 57.

Reference numeral 58 designates a resistor which is effective to connect the series connected diodes 50–52 through resistor 58, and through switch 57, to the source of voltage 56, to apply a positive voltage to terminal 54 and a negative voltage to terminal 53. Thus, the tunnel diodes are biased in a forward direction. This circuit means is effective to establish a first stable low voltage operating point, the point $V_1$–I of FIGURE 2.

Reference numeral 59 designates a transistor having an emitter electrode 60, a base electrode 61, and a collector electrode 62. The emitter-to-collector circuit of transistor 59 is connected through a resistor 63 to the voltage source 56. The emitter-to-base circuit of transistor 59, otherwise called the input, is connected to resistor 55.

Resistor 63 is connected in parallel with the tunnel diodes 50–52 through a diode 65, and meter 66 is connected through a resistor 67 in parallel with the diodes 50–52.

The operation of the electric apparatus disclosed in FIGURE 5 is such that, upon photoconductive cell 11 being subjected to a flash of light of short time duration, photogenerated holes and electrons are produced, in the manner above described. With switch 57 closed, an electric field is applied to the semiconductor material of photoconductive cell 11 and a short time duration high peak pulse of current flows through resistor 55. This pulse of current appears as a forward bias for the input electrodes 60–61 of transistor 59. Thus, an amplified pulse of current flows through the output electrodes 60–62 of this transistor, and a voltage of the plurality indicated is developed across resistor 63, this voltage having the same general characteristics as the voltage produced across resistor 55. Thus, the voltage produced across resistor 63 is proportional to the total quantity of holes and electrons produced within photoconductive cell 11, and this in turn is proportional to the total quantity of light energy present in the short time duration flash of light to which the photoconductive cell 11 was subjected.

The voltage so developed across resistor 63 is applied, through diode 65, to the series connected tunnel diodes 50, 51 and 52. A proportionate number of these diodes are triggered from the $V_1$ state of FIGURE 2 to the $V_2$ state, depending upon the peak magnitude of voltage developed across resistor 63. These tunnel diodes are triggered, one at a time, and as each of them is triggered, to move to the stable operating point $V_2$, the voltage $V_2$ is connected as a bucking voltage in opposition to the driving voltage across resistor 63. Thus it is necessary that this driving voltage be of higher level in order to trigger a succeeding tunnel diode. Thus, for a low intensity light (and a smaller peak voltage developed across resistor 63) only one of the tunnel diodes 50–52 is triggered. For an intermediate value of light, two of the tunnel diodes are triggered. For the highest value of light to be measured, all three of the tunnel diodes are triggered. Meter 66 is connected to the tunnel diodes and reads a first low value when only one of them is triggered, reads a higher intermediate value when two of them are triggered, and reads a third higher value when all three of the tunnel diodes are triggered.

From the above description it can be seen that any number of tunnel diodes may be provided in the circuit construction of FIGURES 1 and 5, to function in the manner described. Furthermore, the meters 26 and 66 of the respective FIGURES 1 and 5 continue to indicate the transient peak value of the condition which has occurred, after the condition no longer exists. In the embodiment of FIGURE 5, the opening of switch 57 resets meter 66 and tunnel diodes. In FIGURE 1, I have not shown such a switch. However, similar means may be provided to reset the construction of FIGURE 1.

Since modifications of my invention will be apparent to those skilled in the art, it is intended that the scope of my invention be limited solely by the scope of the appended claims.

I claim as my invention:

1. In combination: a plurality of tunnel diodes, bias means connected to each of said tunnel diodes to establish a first stable operating point therefor on the low voltage portion of the characteristic curves thereof; a photoconductive cell adapted to be subjected to a flash of light, a plurality of impedance elements of increasing impedance magnitude; circuit means connecting said photoconductive cell to a plurality of parallel circuits, each of which includes in series connection one of said impedance elements and one of said tunnel diodes, said circuit means being effective upon said photoconductive cell experiencing a flash of light to apply a main current pulse to said parallel circuits of a peak magnitude proportional to the integrated quantity of light energy present in the pulse, and to apply individual current pulses through each individual one of said parallel circuits, which individual current pulses are of relative magnitudes as determined by the relative impedance magnitudes of said impedance elements, to thus trigger a number of said tunnel diodes to a second stable operating point on the high voltage portion of the characteristic curve, said number of tunnel diodes being proportional to the peak magnitude of said main current pulse; and voltage responsive means connected to each individual tunnel diode and providing a sustained output voltage of a magnitude proportional to the number of tunnel diodes which are triggered to said second stable operating point.

2. In combination: a plurality of series connected tunnel diodes, a source of voltage, impedance means, circuit means connecting said series connected tunnel diodes in series with said impedance means to said source of voltage to apply a bias current through said tunnel diodes establishing a first stable operating point therefor on the low voltage portion of the characteristic curve; a photoconductive cell adapted to be subjected to a flash of light, further circuit means connected to said photoconductive cell to provide a short time duration voltage pulse in response to the flash of light, said voltage pulse having a peak magnitude which is proportional to the integrated quantity of light present in the flash of light; means connecting said further circuit means to said series connected tunnel diodes to apply said voltage pulse thereto as a control pulse to trigger a number of said tunnel diodes, which is proportional to the peak magnitude of said voltage pulse, to a second stable operating point of high voltage where said number of tunnel diodes are then maintained by said bias current; and voltage responsive means connected in parallel with said plurality of series connected tunnel diodes to provide a sustained output voltage of a magnitude proportional to the integrated quantity of light present in the flash of light.

3. A flash light meter, comprising: a photoconductive cell having semiconductor means adapted to be subjected to a short time duration flash of light to thus generate long lifetime holes and electrons in a quantity proportional to the integrated light energy present in the flash, a first resistor, a source of voltage, first circuit means connecting said cell, said first resistor, and said source of voltage in a series circuit to thus apply an electric field to said semiconductor means and to cause a short time duration current pulse to flow through said first resistor of a peak magnitude proportional to the quantity of holes and electrons generated by the flash; a plurality of series connected tunnel diodes, a second resistor, second circuit means connecting said tunnel diodes in series with said second resistor to a source of voltage to bias said tunnel diodes to a low voltage operating point on the characteristic curves thereof; a controllable current conducting device having a pair of input electrodes and a pair of output electrodes, one of said input electrodes being common to one of said output electrodes, a third resistor, circuit means connecting said output electrodes through said third resistor to a source of voltage; circuit means connecting said input electrodes to said first circuit means to apply said short time duration current pulse to said input electrodes as a control pulse; circuit means connecting said output electrodes to said second circuit means to apply a short time duration voltage pulse to said tunnel diodes of a peak magnitude proportional to the quantity of holes and electrons generated by the flash, said voltage pulse being effective to trigger a proportionate number of said tunnel diodes to a high voltage operating point, to be maintained at said high voltage operating point by the bias of said second circuit means; and voltage responsive means connected to said tunnel diodes and responsive to the voltage thereacross to provide a sustained output voltage of a magnitude proportional to the quantity of holes and electrons generated by the flash.

4. In combination, a plurality of tunnel diodes, a plurality of first resistors, a source of voltage, first circuit means connecting each of said tunnel diodes in series with one of said first resistors to said source of voltage to bias said tunnel diodes to a low voltage operating point; a photoconductive cell adapted to be subjected to a flash of light of short time duration and to thus generate long lifetime holes and electrons in proportion to the integrated quantity of light present in the flash, a plurality of second resistors of graduated resistance magnitude, conductors connecting each of said second resistors in series with said cell across a respective one of said first resistors, each of said second resistors thereby being effective to apply graduated control current pulses to the individual tunnel diodes to switch a proportionate number to a high voltage operating point, the number so switched being proportionate to the integrated quantity of light present in the flash; and readout means connected to said tunnel diodes to provide a sustained output voltage of a magnitude proportional to the integrated quantity of light present in the flash.

5. In combination, a plurality of series connected tunnel diodes, a first resistor, first circuit means connecting said tunnel diodes in series with said first resistor to a source of voltage to bias said tunnel diodes to a low voltage operating point; a photoconductive cell adapted to be subjected to a short time duration flash of light to proportionately generate long lifetime holes and electrons in response thereto, a second resistor, second circuit means connecting said cell and said second resistor in series to a source of voltage to apply an electric field to said cell and thus develop a short time duration current pulse across said second resistor of a peak magnitude in proportion to the number of holes and electrons produced by the flash; a transistor, a third resistor, circuit means connecting output electrodes of said transistor through said third resistor to a source of voltage; circuit means connecting input electrodes of said transistor to said second resistor, circuit means connecting said third resistor in parallel with said series connected tunnel diodes to effect a switching of a number of said tunnel diodes to a high voltage operating point as determined by the number of holes and electrons produced by the flash; and voltage responsive means connected in parallel with said series connected tunnel diodes to provide a sustained output voltage of a magnitude proportional to said number of switched tunnel diodes.

References Cited
UNITED STATES PATENTS 2,588,368   3/1952   Edgerton _____ 88—23
3,160,873   12/1964  Amodel et al.

OTHER REFERENCES

Edgerton et al., Measuring Transient Light with Vacuum Phototubes. Electronics (Aug. 25, 1961), pp. 56 and 57.

JEWELL H. PEDERSEN, *Primary Examiner.*

W. L. SIKES, *Assistant Examiner.*